United States Patent
Haines (10) Patent No.: US 6,367,774 B1
(45) Date of Patent: Apr. 9, 2002

(54) ELEMENT HAVING CERAMIC INSERT AND HIGH-STRENGTH ELEMENT-TO-SHAFT CONNECTION FOR USE IN A VALVE

(75) Inventor: Bradford B. Haines, Spanish Fork, UT (US)

(73) Assignee: Flowserve Corporation, Irving, TX (US)

( * ) Notice: Subject to any disclaimer, the term of this patent is extended or adjusted under 35 U.S.C. 154(b) by 0 days.

(21) Appl. No.: 09/552,624

(22) Filed: Apr. 19, 2000

(51) Int. Cl.⁷ ............................................... F16K 5/08
(52) U.S. Cl. .................. 251/315.04; 251/368; 251/309
(58) Field of Search .............. 251/315.04, 315.05, 251/315.01, 315.16, 315.1, 309, 315.03, 368

(56) References Cited

U.S. PATENT DOCUMENTS

| | | |
|---|---|---|
| 3,948,533 A | 4/1976 | Novosad |
| 3,949,965 A | 4/1976 | Sharples et al. |
| 3,985,150 A * | 10/1976 | Kindersley ......... 251/315.04 X |
| 4,272,057 A * | 6/1981 | Haugland .............. 251/315.01 |
| 4,346,730 A | 8/1982 | Gardner |
| 4,719,074 A | 1/1988 | Tsuno et al. |
| 4,722,825 A | 2/1988 | Goldstein |
| 4,771,803 A | 9/1988 | Berchem et al. |
| 4,795,133 A | 1/1989 | Berchem et al. |
| 4,810,585 A | 3/1989 | Oda et al. |
| 4,815,704 A | 3/1989 | Berchem |
| 4,834,042 A | 5/1989 | Wakasa et al. |
| 4,871,621 A | 10/1989 | Bagley et al. |
| 4,932,432 A | 6/1990 | Berchem |
| 4,936,546 A | 6/1990 | Berchem |
| 5,015,609 A | 5/1991 | Newkirk et al. |
| 5,183,068 A | 2/1993 | Prosser |
| 5,365,661 A | 11/1994 | Mizuno et al. |
| 5,386,967 A | 2/1995 | Enniss et al. |
| 5,566,923 A | 10/1996 | Ennis et al. |
| 5,906,354 A | 5/1999 | Gilbert et al. |
| 5,977,487 A | 11/1999 | Kuhl |

* cited by examiner

Primary Examiner—Kevin Lee
(74) Attorney, Agent, or Firm—TraskBritt (57) ABSTRACT

An element for controlling the fluid flow rate through a fluid valve. The element may include a generally spherical metal housing encasing a cylindrical ceramic insert. The element may also include a cone-shaped metal housing encasing a cylindrical ceramic insert. The cylindrical ceramic insert defines a fluid passageway through the element. The element further includes a coupling mechanism disposed on the metal housing configured for securing a metal actuation shaft to the element. The coupling mechanism provides a high-strength element-to-shaft connection between the metal actuation shaft and a metal portion of the element. The present invention also encompasses a method of manufacturing the element.

19 Claims, 5 Drawing Sheets

ELEMENT HAVING CERAMIC INSERT AND HIGH-STRENGTH ELEMENT-TO-SHAFT CONNECTION FOR USE IN A VALVE

BACKGROUND OF THE INVENTION

1. Field of the Invention

The present invention relates generally to valves for controlling fluid flow and, more particularly, to an element having high strength and both corrosion and erosion resistance for use in a valve. Specifically, the present invention relates to a metallic element having a non-metallic, cylindrical insert secured therein to provide resistance to corrosion and erosion, wherein a coupling mechanism on a metallic portion of the element provides a high-strength element-to-shaft connection. The present invention also encompasses a method of manufacturing a high-strength, erosion and corrosion resistant element for a valve.

2. State of the Art

Many industrial processes consume, or make use of, fluids that may be either highly corrosive, highly abrasive, or both. Corrosive fluids include a broad array of chemicals that may be corrosive to both ferrous and nonferrous metals, as well as other materials. Abrasive fluids include slurries comprising a primary fluid or fluid mixture in which solid particulate matter is suspended. Particles of contaminates carried by an otherwise non-abrasive fluid may also cause erosion. Also, industrial applications often necessitate the delivery of corrosive and/or erosive fluids at high flow rates, high temperature, or both. Industrial processes, as well as scientific or laboratory applications, consuming or making use of corrosive or abrasive fluids—whether at high flow rate or high temperature—require fluid delivery systems adapted to function in severe operating environments.

Industrial fluid delivery systems routinely include one or more fluid valves configured to control the rate of, or completely terminate, fluid flow through the system. These fluid control valves must be constructed of components adapted to withstand the severe operating environments created by corrosive and/or erosive fluids flowing at high temperature or high flow rate. High temperatures may increase the rate at which a fluid chemically attacks (i.e., corrodes) internal components of a valve, and high temperatures may also subject a valve to thermal stresses, especially if thermal cycling is present. Process conditions in the fluid may dictate high pressure drops or high flow rates, subjecting the valve to higher stresses.

A type of valve commonly employed in industrial fluid transportation systems is the ball valve. A conventional ball valve is shown in cross-section in FIG. 1. The conventional ball valve 1 includes a ball or ball element 10 configured to control the rate of fluid flow through the conventional ball valve 1. The ball element 10 comprises a generally spherical body 12 having a cylindrical-shaped fluid passageway 14 extending therethrough and defined by an interior surface 16. Fluid passageway 14 defines a flow path through the ball element 10. The direction of fluid flow through the conventional ball valve 1 and fluid passageway 14 is indicated generally by an arrow 5. The ball element 10 further includes a coupling mechanism 18 configured for attachment of one end of an actuation shaft 20 to the ball element 10.

Figure 1:
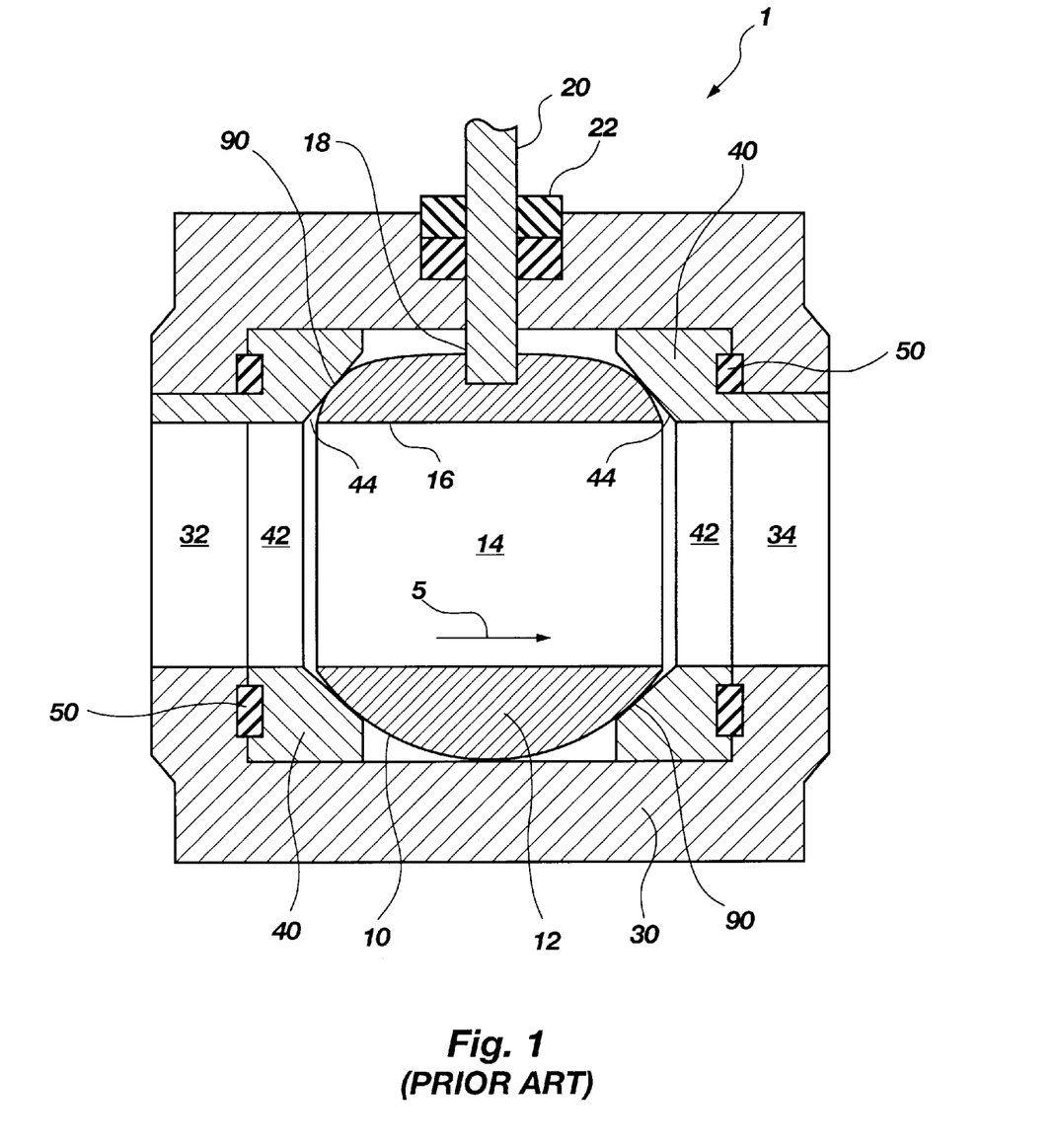
FIG. 1 is a cross-sectional view of a prior art conventional ball valve.

The conventional ball valve 1 also includes a housing 30 having an inlet 32 and an outlet 34. The inlet 32 and outlet 34 each define a generally cylindrical hole having a diameter of substantially the same size as a diameter of the fluid passageway 14 extending through ball element 10. Supporting the ball element 10 within the housing 30 are seats or seals 40. Each seat 40 comprises a generally cylindrical-shaped structure including a cylindrical aperture 42 extending therethrough and further including a circumferential seating surface 44. The diameter of the aperture 42 of each seat 40 is substantially the same as the diameter of the fluid passageway 14 extending through the ball element 10. The circumferential seating surface 44 of each seat 40 contacts the spherical body 12 along a continuous, circumferential contact region 90. Biasing elements 50 may elastically bias the seating surface 44 of each seat 40 into contact with the ball element 10. The interface between the circumferential seating surface 44 of a seat 40 and the outer surface of ball element 10 at the circumferential contact region 90 functions as a seal, preventing fluid present within inlet 32, fluid passageway 14, outlet 34, and apertures 42 from leaking past, or flowing around, ball element 10 and seats 40. The conventional ball valve 1 may also include a shaft seal 22 guiding the actuation shaft 20 into the housing 30 and preventing fluid leakage therebetween.

Rotation or stroking of the actuation shaft 20 and attached ball element 10 effects a change in flow rate through the conventional ball valve 1. In FIG. 1, the conventional ball valve 1 is depicted in the fully-open position wherein the inlet 32, fluid passageway 14, and outlet 34 are substantially concentrically aligned. Rotation of the ball element 10 away from the fully-open position results in decreased fluid flow through the conventional ball valve 1 as the cross-sectional area of fluid passageway 14 that is open to receive fluid flow from inlet 32 decreases, thereby increasing the resistance to fluid flow through the conventional ball valve 1. In the fully-closed position, the ball element 10 is rotated such that no portion of fluid passageway 14 is open to receive fluid flow from the inlet 32 and the flow of fluid through the conventional ball valve 1 is shut off.

Components of the conventional ball valve 1—in particular, the ball element 10—are constructed of metal and typically perform poorly in the severe environments characteristic of erosive, corrosive or abrasive fluid flow. High temperatures and large flow rates further accelerate degradation of metal surfaces within the conventional ball valve 1. To adapt the conventional ball valve 1 for use with erosive, corrosive and/or abrasive fluids, various non-metallic materials exhibiting high resistance to corrosion and erosion have been incorporated into the conventional ball valve 1. One specific approach commonly used by valve designers is to construct the ball element 10 from a ceramic material. Ceramic materials typically have corrosion and erosion resistance properties superior to those of most metals. The seats 40 may also be fabricated of a ceramic or other non-metallic material.

Constructing a ball valve having a solid ceramic ball element may greatly improve the ability of the ball valve to operate in the severe operating environments characteristic of corrosive or abrasive fluid flow; however, use of a solid ceramic ball element typically results in degradation of the structural integrity of the ball valve. Specifically, ceramic materials are less ductile than are metals and, therefore, are much more susceptible to fracture under tensile loads. The reduced fracture toughness of a solid ceramic ball element— as compared to a solid steel ball element—gives rise to a weak linkage between the ball element and an actuation shaft secured thereto. Also, outer surfaces of a solid ceramic ball element oriented generally perpendicular to the flow stream are more susceptible to fracture and cracking due to impact by solid particulate matter present in the fluid flow.

For ball valves incorporating a solid ceramic ball, a conventional ball-to-shaft coupling comprises one end of a metal actuation shaft secured in a mating hole on the ceramic ball element. When torsional loads are applied to the actuation shaft, such a ball-to-shaft connection exhibits high tensile stresses in the ceramic ball element proximate the outer circumference of the mating hole in the ball element where the actuation shaft is inserted. A large pressure drop across the ball valve places a large load on the ball element, thereby increasing the torque load on the actuation shaft and, accordingly, the tensile loads in the ceramic ball element proximate the ball-to-shaft coupling. Build-up of scaling and other contaminates on the surface of the ball element also increase the torque load on the actuation shaft and the tensile loads in the ceramic ball element. Further, if a foreign object becomes wedged between the solid ceramic ball element and the housing or seats during stroking, failure at the ball-to-shaft connection due to tensile stresses on the ceramic ball is nearly certain.

A number of approaches have been suggested to improve the strength of the ball-to-shaft connection between a solid ceramic ball and a metal actuation shaft. U.S. Pat. No. 5,566,923 to Ennis et al., U.S. Pat. No. 5,386,967 to Ennis et al., and U.S. Pat. No. 4,936,546 to Berchem, each discloses a method of increasing the strength of the ball-to-shaft connection between a solid ceramic ball and a metal actuation shaft using mechanical advantage. Generally, a mechanical advantage is obtained using a ball-to-shaft coupling comprised of a plurality of mating pins and holes positioned away from the rotational axis of the ball element. For example, the solid ceramic ball may include a plurality of holes arranged in a pattern on an interface surface, with the metal actuation shaft having a plurality of mating pins extending from one end thereof arranged in a corresponding pattern. Radially spacing the holes on the ceramic ball element away from its rotational axis and using multiple pins and holes allows a larger moment to be transferred to the ball with lower forces, therefore, lower tensile stresses are induced in the solid ceramic ball in the vicinity of each hole. Although reduced, tensile stresses on the ceramic ball element remain. A further drawback of these methods is the difficulty in manufacturing such a ball-to-shaft coupling due to precise alignment and design tolerances that must be maintained between the mating pins and holes.

U.S. Pat. No. 3,949,965 to Samples et al. suggests manufacturing a ball element and attached actuation shaft as a single, integral ceramic structure. Use of an integral ball element and actuation shaft eliminates the ball-to-shaft connection and the stress loads inherent to such a connection. However, an integral ball element and actuation shaft comprised of ceramic as described by Samples et al. is structurally weak as a ceramic actuation shaft cannot withstand high torque loads.

Another conventional method for strengthening the ball-to-shaft connection in a ball valve having a solid ceramic ball element is to employ an actuation shaft having a shaped end or key and a correspondingly shaped slot or keyway on the solid ceramic ball element. For example, the shape of the key and keyway may be square or hexagonal. Use of a mating key and keyway to link a ceramic ball element and a metal actuation shaft does reduce the tensile stresses in the ceramic ball element proximate the keyway; however, tensile stresses are still present in the ceramic ball element which will cause failure.

In view of these shortcomings, there is a need in the art for a ball element with a ball valve exhibiting high corrosion resistance and high erosion resistance that does not exhibit a structural weak link at the ball-to-shaft connection between the ball element and an actuation shaft. Further, there is a need in the art for such a ball element for a ball valve that can withstand high flow rates, large pressure drops, and high temperatures.

SUMMARY OF THE INVENTION

The present invention comprises an element for use in valves of varying sizes and types. The element according to one embodiment of the present invention includes a generally spherical housing comprised of a metallic material encasing a cylindrical insert. The cylindrical insert defines a fluid passageway through the ball element and is fabricated from a non-metallic material highly resistant to corrosion, erosion, and high temperatures, such as a ceramic material. The ball element further includes a coupling mechanism disposed on the spherical housing configured for attaching a metal actuation shaft to the ball element. In a particular embodiment of the invention, the coupling mechanism may provide a coupling between the ball element and actuation shaft that allows the ball to float. Because the ball-to-shaft coupling is provided between the metal actuation shaft and a metallic portion of the ball element, a high-strength metal-on-metal connection may be provided between the actuation shaft and the ball element of the present invention.

The present invention also includes a method of manufacturing the ball element. In one embodiment of the invention, the ball element is manufactured by providing a ceramic cylinder having an outer circumferential surface that has been uniformly ground to a desired outside diameter. A metal cylinder having an interior circumferential surface that has been formed to a uniform inside diameter that is smaller than the outside diameter of the ceramic cylinder is provided. The metal cylinder is heated to a temperature sufficient to expand the inside diameter of the metal cylinder to at least the dimension of the outside diameter of the ceramic cylinder and the ceramic cylinder is inserted into the metal cylinder. The metal cylinder is then cooled to shrink the metal cylinder and impart compressive forces on the ceramic cylinder, thereby holding the ceramic cylinder within the metal cylinder. The metal cylinder is rough machined into a spherical shape and the metal cylinder and ceramic cylinder are ground to form the final, desired shape of the ball element. After the final shape of the ball element is achieved, additional structural features may then be machined on the ball element to form the coupling mechanism.

The present invention also includes elements for use in valves, comprised of a metallic material encasing a cylindrical insert made from a non-metallic material, having various sizes and shapes. In one embodiment of the invention, a cone-shaped element for use in plug valves includes a cylindrical insert made from a non-metallic material, such as a ceramic material, that is highly resistant to erosion and corrosion. The cylindrical insert is encased by a cone-shaped element made of a metallic material, which further includes a coupling mechanism for attaching a metal actuation shaft to the cone-shaped element that provides a high-strength metal-on-metal connection therebetween.

BRIEF DESCRIPTION OF THE SEVERAL VIEWS OF THE DRAWINGS

While the specification concludes with claims particularly pointing out and distinctly claiming that which is regarded as the present invention, the features and advantages of this invention can be more readily ascertained from the following detailed description of the invention when read in conjunction with the accompanying drawings, in which:

DETAILED DESCRIPTION OF THE INVENTION

Figure 2:
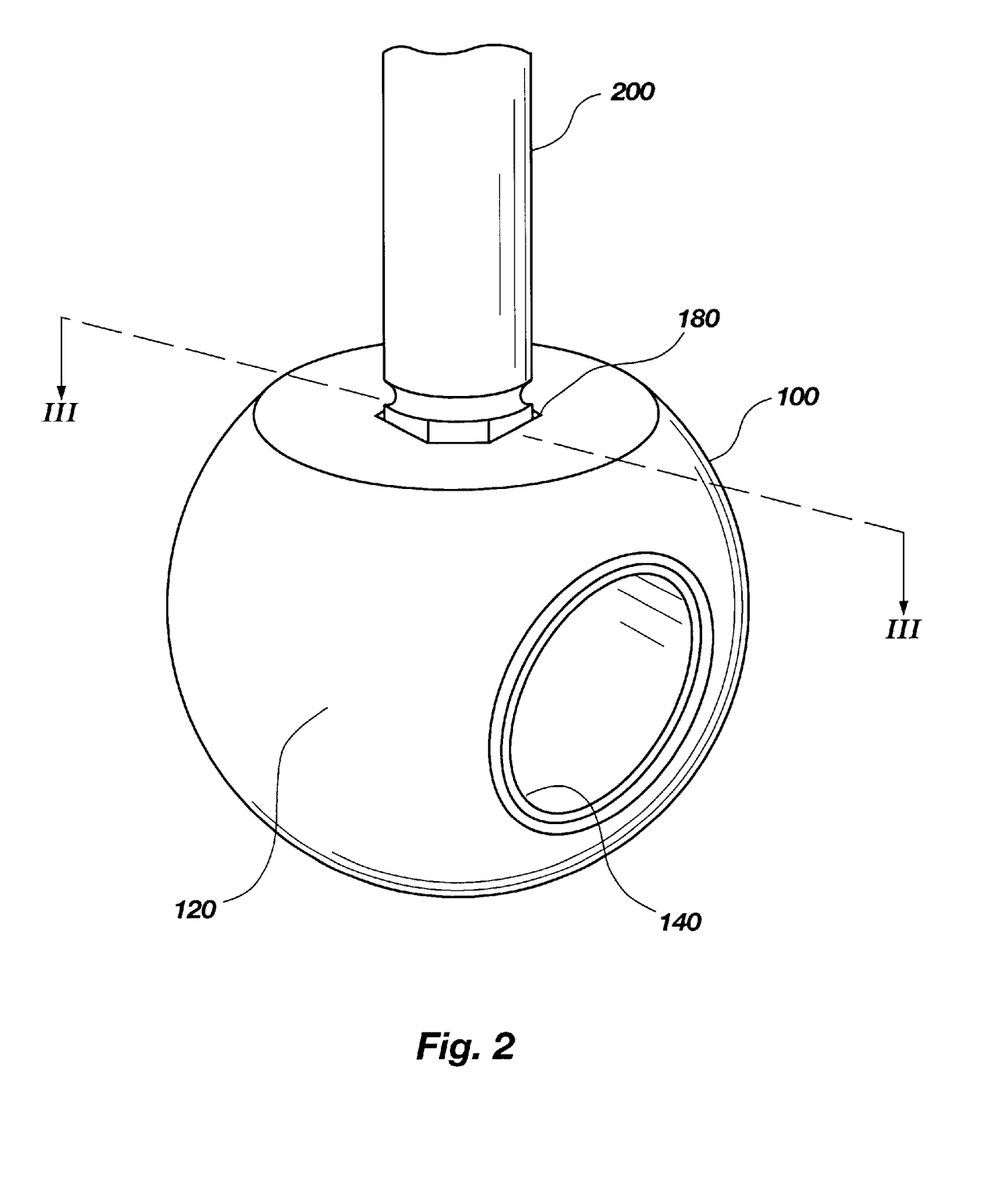
FIG. 2 is a perspective view of a ball element for a ball valve according to the present invention.

A ball element according to the present invention is shown in FIG. 2. The ball element 100 comprises a generally spherical housing 120 encasing a cylindrical insert 140. The ball element 100 further includes a coupling mechanism 180 configured for attaching the housing 120 to an actuation shaft 200. The ball element 100 of the present invention may be incorporated into any suitable ball valve known in the art, such as the conventional ball valve 1 shown in FIG. 1. Further, the ball element 100 may be used in any size ball valve or used with any type of ball valve (i.e., control valve, on/off valve, automatic or manual control, etc.) known in the art.

Figure 3:
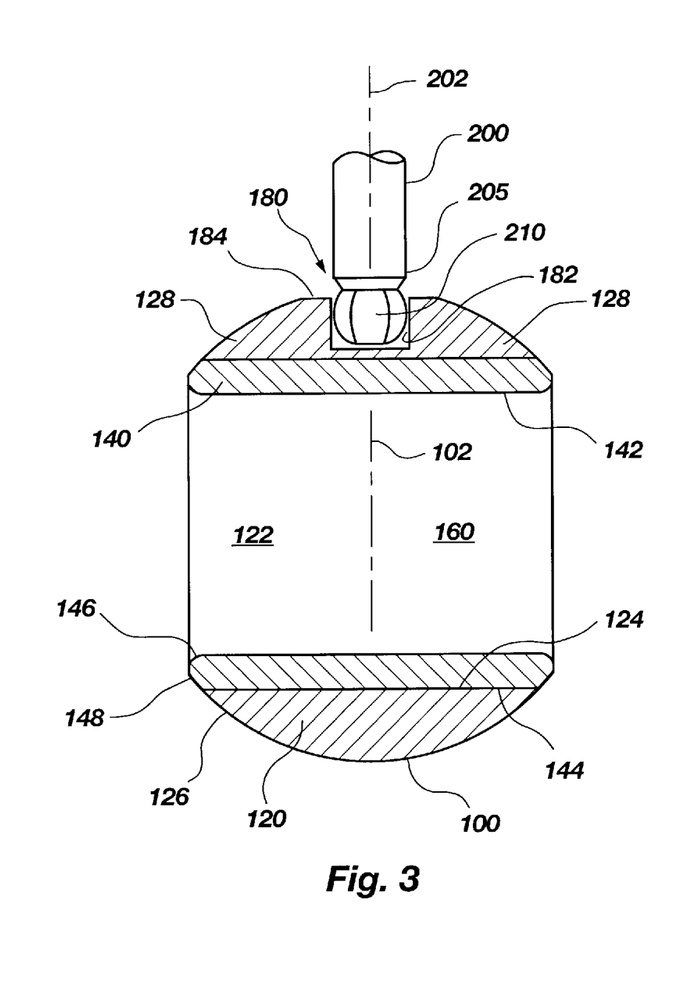
FIG. 3 is a cross-sectional view of the ball element of the present invention as taken along line III—III of FIG. 2.
Figure 4:
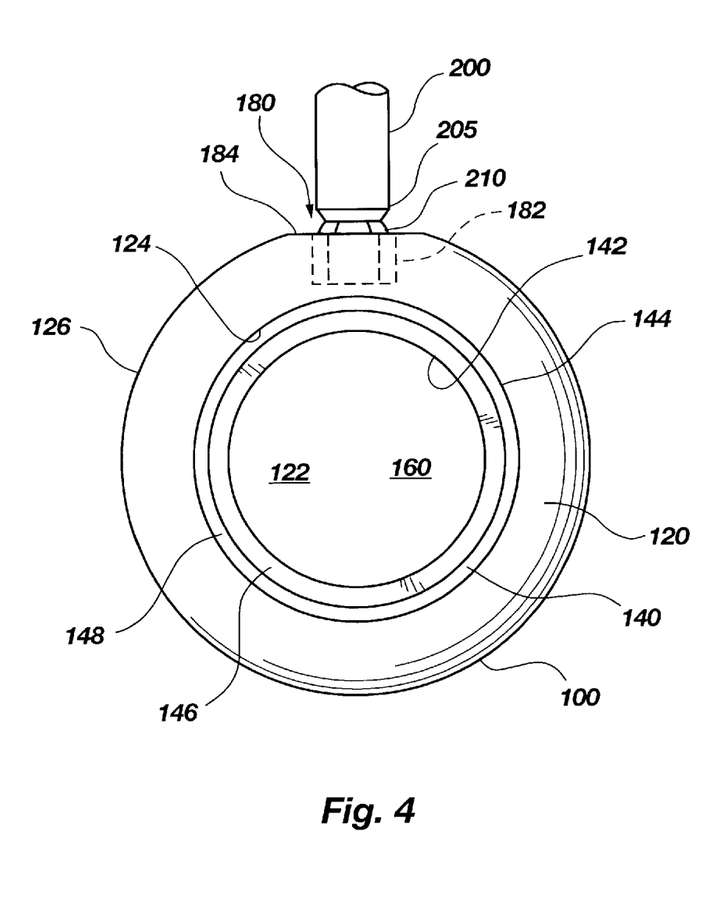
FIG. 4 is a side elevation view of the ball element of the present invention shown in FIG. 2.

Referring to FIGS. 3 and 4, the cylindrical insert 140 of ball element 100 defines a fluid passageway 160 defined by an inner cylindrical surface 142. Cylindrical insert 140 also includes an outer cylindrical surface 144 generally concentric with inner cylindrical surface 142. At least one end of the cylindrical insert 140 may include an inner circumferential fillet 146 or an outer circumferential fillet 148, or both. The cylindrical insert 140 is comprised of a corrosion and erosion resistant non-metallic material, such as a ceramic material. By way of example only, the cylindrical insert 140 may be manufactured from silicon carbide, alumina, nitride, or a partially stabilized zirconia (such as Transformation Toughened Zirconia (TTZ) manufactured by the Coors Ceramics Company of Golden, Colo.). Also within the scope of the present invention is a cylindrical insert 140 constructed of a non-ceramic material such as a high-temperature grade polymer material.

The spherical housing 120 of ball element 100 includes a cylindrical hole 122 extending therethrough defined by an inner cylindrical surface 124. The spherical housing 120 also includes an outer surface 126. The cylindrical insert 140 is secured within the cylindrical hole 122 of spherical housing 120, the inner cylindrical surface 124 of spherical housing 120 concentrically overlaying the outer cylindrical surface 144 of cylindrical insert 140. The spherical housing 120 may be fabricated from any suitable metallic material known in the art. For example, the spherical housing 120 may comprise titanium or a titanium alloy, a nickel alloy such as Monel 400, Inconel 600, or Incoloy 800, or a stainless steel such as type 316, type 17-4ph, or type 317, or any other corrosion resistant alloy steel that is known in the art.

The ball element 100 of the present invention further includes a coupling mechanism 180. Coupling mechanism 180 is configured for securing the spherical housing 120 of ball element 100 to a lower end 205 of the actuation shaft 200. Thus, the coupling mechanism 180 provides a ball-to-shaft connection comprising a metal-on-metal engagement, thereby eliminating the potential for fracture at the ball-to-shaft coupling as was characteristic for prior art solid ceramic ball elements.

The coupling mechanism 180 may comprise any suitable structure as known in the art capable of securing the actuation shaft 200 to the ball element 100, which generally includes a female slot in a ball element into which a corresponding male tang from the actuation shaft is inserted. By way of example only, the coupling mechanism 180 may comprise a "floating" coupling configured to enable the ball element 100 to "float" relative to the actuation shaft 200. A floating coupling may, for example, include a hex-shaped slot 182 formed in the spherical housing 120 of ball element 100 and a mating hex-shaped head 210 on a lower end 205 of actuation shaft 200, as illustrated in FIGS. 3 and 4. The hex-shaped head 210 of actuation shaft 200 is generally spherical. Also, to facilitate engagement of the actuation shaft 200 with the ball element 100, the spherical housing 120 may include a flat 184 formed thereon.

During operation within a ball valve, the ball element 100 must rotate with the actuation shaft 200 while exhibiting approximately zero angular deviation. In other words, for every angle through which the actuation shaft 200 turns about the axis of rotation 202 of the actuation shaft 200, the ball element 100 must rotate through substantially the same angle about the axis of rotation 102 of ball element 100. The mating relationship between the hex-shaped slot 182 on ball element 100 and the hex-shaped head 210 on actuation shaft 200 provides the required rotational relationship (approximately zero angular deviation) between the ball element 100 and the actuation shaft 200.

The spherical configuration of hex-shaped head 210 on actuation shaft 200, however, allows the ball element 100 to angularly float about one or more axis perpendicular to the axis of rotation 202 of actuation shaft 200. Stated differently, the orientation of the axis of rotation 102 of the ball element 100 is allowed to angularly deviate from the orientation of the axis of rotation 202 of the actuation shaft 200—i.e., the axis of rotation 102 of ball element 100 is not parallel with the axis of rotation 202 of actuation shaft 200—in a manner similar to a universal joint. Allowing the axis of rotation 102 of the ball element 100 to float relative to the axis of rotation 202 of the actuation shaft 200 is critical to providing a robust and reliable seal between the ball element 100 and the seats in an assembled ball valve.

It will be understood by those of ordinary skill in the art that numerous alternative structures may be devised to provide a floating coupling between the ball element 100 and the actuation shaft 200 and these alternative structures are within the scope of the present invention. For example, the cross-sectional profile of the head 210 of actuation shaft 200 and the cross-sectional profile of slot 182 of ball element 100 may be a cross-sectional profile other than a hex shape. Alternatively, a universal type joint may be disposed between the lower end 205 of actuation shaft 200 and the ball element 100. Those of ordinary skill in the art will also appreciate that the coupling mechanism 180 may, alternatively, provide a rigid attachment between the ball element 100 and the actuation shaft 200.

Also within the scope of the present invention is a unique method of manufacturing the ball element 100. In an exemplary embodiment of a method of manufacturing the ball element 100, a ceramic cylinder is provided having an outer circumferential surface that has been ground to provide a fine finish and substantially no taper. A metal cylinder is then provided having an outside diameter that is at least as large as the desired outside diameter of the ball element 100. The metal cylinder also has an interior circumferential surface that has been formed to a desired surface finish and a uniform inner diameter that is smaller than an outside diameter of the ceramic cylinder. Preferably, the inner diameter of the metal cylinder is 0.0005 to 0.015 inches smaller than the outside diameter of the ceramic cylinder.

The metal cylinder is then heated to a temperature sufficient to expand the metal cylinder such that the inner diameter of the metal cylinder is at least equivalent or slightly larger in dimension relative to the outside diameter of the ceramic cylinder. To expand the metal cylinder, the metal cylinder may be heated to a temperature of between 400 degrees Fahrenheit (F.) and 1100 degrees F. While the metal cylinder is in the expanded condition, the ceramic cylinder is inserted into the metal cylinder to form a metal-ceramic cylinder assembly. The metal cylinder is then allowed to cool, shrinking the metal cylinder. As the metal cylinder shrinks, the interior circumferential surface of the metal cylinder imparts compressive forces on the outer circumferential surface of the ceramic cylinder, thereby retaining the ceramic cylinder in place within the metal cylinder.

The outer circumferential surface of the ceramic cylinder, the interior circumferential surface of the metal cylinder, or both, may include a surface coating or a surface treatment. If either or both of the ceramic and metal cylinders includes a surface coating or treatment, the outer circumferential surface of the ceramic cylinder may not necessarily be in direct contact with the interior circumferential surface of the metal cylinder. A surface coating on either of the outer circumferential surface of the ceramic cylinder or the interior circumferential surface of the metal cylinder may be used to facilitate adhesion therebetween, as well as to improve other structural or chemical characteristics of a ball element 100.

The metal portion of the metal-ceramic cylinder assembly is then rough machined into a spherical or ball shape. During the rough machining process, no machine tooling should contact the ceramic portion of the metal-ceramic cylinder assembly. After rough machining, the metal-ceramic cylinder assembly is subjected to a grinding process to form the final, desired spherical shape of the ball element 100. Structural features may then be machined on the ball element 100 to form a coupling mechanism 180. An advantageous characteristic of the manufacturing method of the present invention is the provision of stress reliefs near the ends of the cylindrical insert 140. As seen in FIG. 3, the circumferential ends 128 of the spherical housing 120 have a continuously thinning cross-section and truncate at a circumferential tip. The thinned circumferential ends 128 of the spherical housing 120 provide a stress relief for the respective ends of the cylindrical insert 140, thereby preventing the ends of the cylindrical insert 140 from chipping off, cracking, or otherwise fracturing.

A ball element 100 according to the present invention having been described in detail, those of ordinary skill in the art will appreciate the many advantages of the ball element 100 and a ball valve incorporating the ball element 100. A cylindrical insert 140 comprised of ceramic provides a fluid passageway exhibiting the corrosion resistance, erosion resistance, and high temperature characteristics necessary for many industrial fluid transportation systems. However, because the spherical housing 120 encasing the cylindrical insert 140 is fabricated from a metallic material, a high-strength ball-to-shaft connection is provided. The high-strength ball-to-shaft connection includes a coupling mechanism 180 formed on the spherical housing 120 configured to mate with a lower end 205 of a metal actuation shaft 200, thereby providing a metal-on-metal coupling able to withstand high torque loads and high pressure drops across the ball element.

The ball element 100 of the present invention, including a ceramic cylindrical insert 140 encased in a metal spherical housing 120, also provides increased fracture resistance to impact by solid particulates. For example, during stroking, the outside surface of the ball element 100 may be positioned within, and generally perpendicular to, the fluid stream. If solid particulate matter is present within the fluid flow, the solid particulates may impact the outer surface of the ball element 100. However, the outer surface of the ball element 100 is substantially comprised of the outer surface 126 of metallic spherical housing 120 and, therefore, is able to better withstand solid particle impacts as compared to prior art solid ceramic ball elements. Similarly, the ball element 100 will exhibit a greater resistance to fracture during stroking caused by a solid object becoming wedged between the ball element 100 and other valve components.

Another advantageous feature of the ball element 100 of the present invention is improved shut-off characteristics. During shut-off, leakage around the ball element in a conventional ball valve is prevented by a seal formed between the ball element and at least one of two mating seats. For ball valves adapted for use in severe industrial applications, the seats are commonly manufactured from a ceramic material. Thus, for a ball valve having a solid ceramic ball element, the region of contact between the solid ceramic ball element and the ceramic seats comprises a ceramic-on-ceramic seal. However, a ceramic-on-ceramic seal may provide poor sealing characteristics as ceramic materials typically do not substantially yield elastically. In contrast, in the ball element 100 of the present invention, the seal is formed between the seats and the spherical housing 120, which is a metallic material. Thus, the present invention allows for a metal-on-ceramic seal that provides a more compliant seating surface on the ball element 100 and, accordingly, improved sealing characteristics.

The ball element 100 of the present invention contains lower overall ceramic content (as compared to prior art solid ceramic ball elements) which may advantageously lower material, grinding, and other processing costs. Additionally, the ball element 100 according to the present invention may be incorporated into ball valves of various sizes and types.

Figure 5:
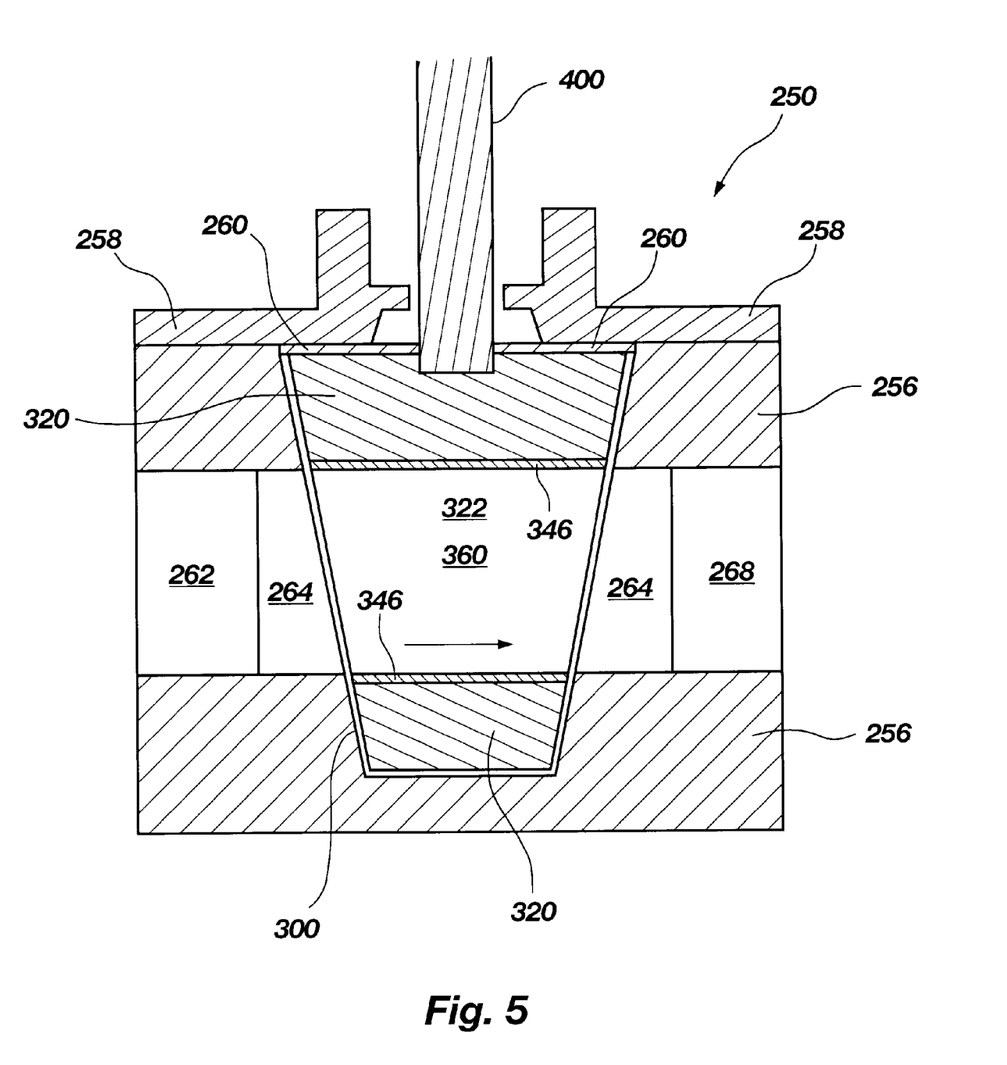
FIG. 5 is a cross-sectional view of a cone-shaped element for a plug valve according to the present invention.

Those having skill in the art will recognize that the principles and advantages of the present invention can be employed in elements and valves having various shapes and sizes and is not limited to ball elements and valves. For example, the present invention can be employed in a system using a plug valve, such as that shown in FIG. 5. The plug valve 250 of FIG. 5 generally includes a housing 256 having an inlet 262 and an outlet 268, each of which define a cylindrical hole having a diameter equivalent in size to a diameter of fluid passageway 360 extending through element 300 and through cylindrical apertures 264 extending through housing 256. Supporting the element 300 within the housing 256 are seats 258. Seals 260 are located between element 300 and seats 258 to prevent fluid leakage outside of the housing 256.

Figure 6:
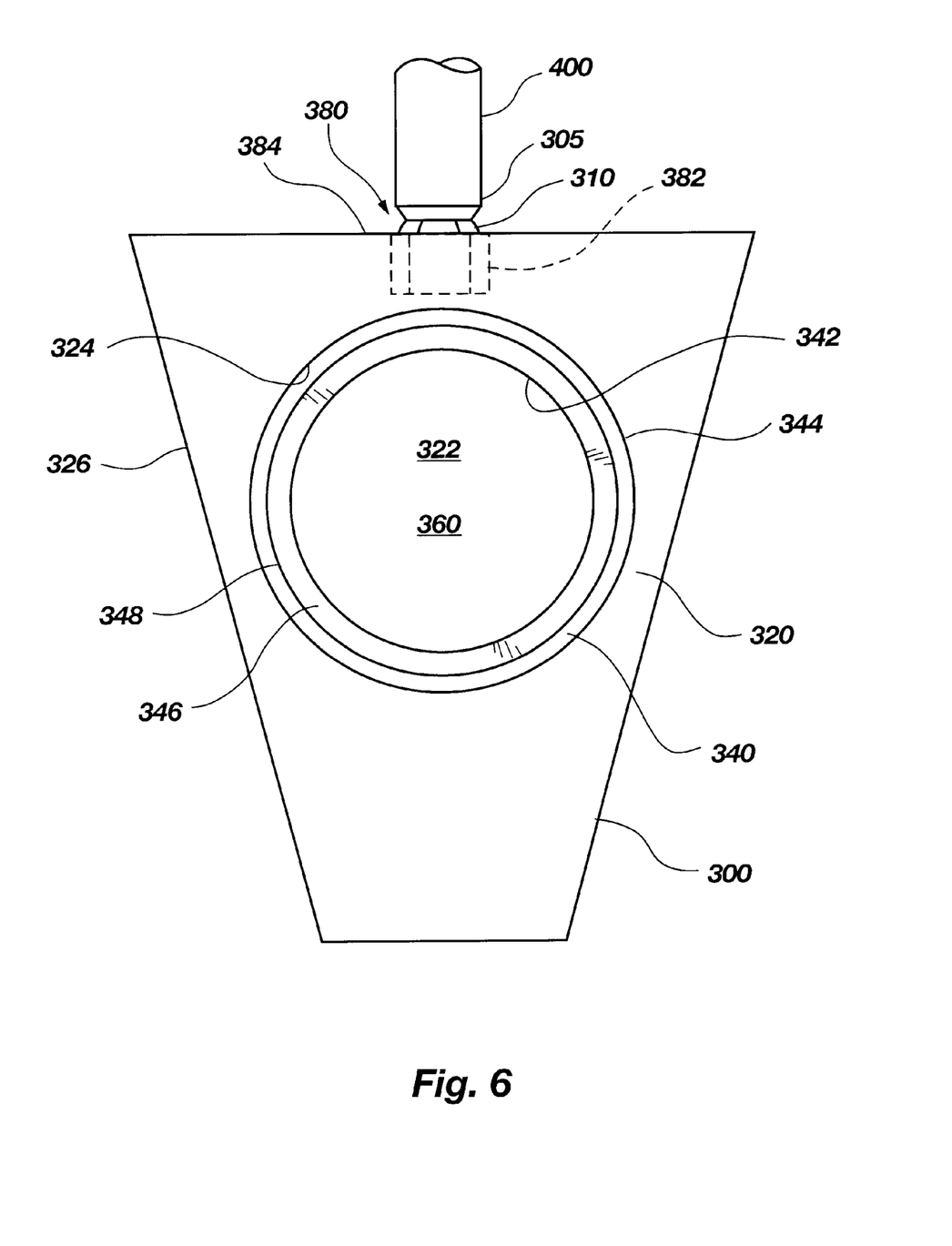
FIG. 6 is a side elevation view of the cone-shaped element of the present invention shown in FIG. 5.

As shown in FIG. 6, the element 300 includes a cylindrical insert 340 that defines a fluid passageway 360 defined by an inner cylindrical surface 342. The cylindrical insert 340 includes an outer cylindrical surface 344 that is generally concentric with inner cylindrical surface 342. Additionally, at least one end of the cylindrical insert 340 may include an inner circumferential fillet 346, an outer circumferential fillet 348, or both. The cylindrical insert 340 is comprised of a corrosion and erosion resistant non-metallic material, such as that described with reference to FIG. 4, and is preferably a ceramic material. The spherical housing 320 of ball element 300 includes an outer surface 326 and a cylindrical hole 322 extending therethrough defined by an inner cylindrical surface 324. The cylindrical insert 340 is secured within the cylindrical hole 322 of spherical housing 320, the inner cylindrical surface 324 of spherical housing 320 concentrically overlaying the outer cylindrical surface 344 of cylindrical insert 340. The housing 320 may be fabricated from any suitable metallic material known in the art and further includes a coupling mechanism 380. As described with reference to FIGS. 3 and 4, the coupling mechanism 380 may comprise a "floating" coupling configured to enable the ball element 300 to "float" relative to the actuation shaft 400. The floating couple may include a hex-shaped slot 382 formed in the spherical housing 320 of ball element 300 and a mating hex-shaped head 310 on a lower end 305 of actuation shaft 400. The spherical housing 320 may include a flat 384 formed thereon. As with the spherical housing 120 of FIG. 4, rotation or stroking of the actuation shaft 400 and attached element 300 effects a change in flow rate through plug valve 250.

The foregoing detailed description and accompanying drawings are only illustrative and not restrictive. They have been provided primarily for a clear and comprehensive understanding of the present invention and no unnecessary limitations are to be understood therefrom. Numerous additions, deletions, and modifications to the preferred embodiment, as well as alternative arrangements, may be devised by those skilled in the art without departing from the spirit of the present invention and the scope of the appended claims.

What is claimed is:

1. A ball element for a ball valve, comprising:
   a substantially spherical-shaped housing comprised of a metallic material, said housing including a cylindrical hole extending therethrough;
   a substantially cylindrical-shaped, compression-fitted insert comprised of a non-metallic material disposed in said cylindrical hole of said housing, said insert having an interior surface defining a fluid passageway; and
   a coupling mechanism disposed on said housing configured for securing an end of an actuation shaft to said housing.

2. The ball element of claim 1, wherein said metallic material is selected from a group consisting of stainless steel, carbon steel, titanium, and titanium alloy.

3. The ball element of claim 1, wherein said non-metallic material is a ceramic material.

4. The ball element of claim 1, wherein said coupling mechanism comprises a floating coupling.

5. The ball element of claim 4, wherein said floating coupling comprises a slot formed in said housing configured to mate with a head disposed on said end of said actuation shaft.

6. The ball element of claim 5, wherein said slot in said housing comprises a hex-shaped slot and said head on said end of said actuation shaft comprises a substantially spherical hex-shaped head.

7. A ball element for controlling a rate of fluid flow in a ball valve, comprising:
   a substantially spherical-shaped metal housing including a cylindrical aperture extending therethrough;
   a substantially cylindrical-shaped, compression-fitted ceramic insert secured within said cylindrical aperture of said metal housing, said ceramic insert having an interior surface defining a fluid flow path; and
   a coupling mechanism disposed on said metal housing configured for securing an end of a metal actuation shaft to said metal housing.

8. The ball element of claim 7, wherein said metal housing is made of a material selected from a group consisting of stainless steel, carbon steel, titanium, and titanium alloy.

9. The ball element of claim 7, wherein said ceramic insert is made of a material selected from a group consisting of partially stabilized zirconia, silicon carbide, alumina, and nitride.

10. The ball element of claim 7, wherein said coupling mechanism comprises a slot formed in said metal housing configured to mate with a head disposed on said end of said metal actuation shaft.

11. The ball element of claim 10, wherein said slot in said metal housing comprises a hex-shaped slot and said head on said end of said metal actuation shaft comprises a substantially spherical hex-shaped head.

12. A flow control element for a fluid control valve, comprising:
   a housing comprised of a metallic material and including an aperture extending therethrough;
   a compression-fitted ceramic insert disposed within said aperture of said housing, said insert further including an interior surface defining a fluid passageway; and
   an actuation shaft having an end securing to said housing.

13. The flow control element of claim 12, further comprising:
   a hex-shaped slot disposed in said housing; and
   a hex-shaped head disposed at said end of said actuation shaft configured to mate with said hexshaped slot in said housing.

14. The flow control element of claim 12, wherein said metallic material is selected from a group consisting of stainless steel, carbon steel, titanium, and titanium alloy.

15. The flow control element of claim 12, wherein said housing is a substantially spherical-shaped housing.

16. The flow control element of claim 15, wherein said housing is a ball element for a ball valve.

17. The flow control element of claim 12, wherein said housing is a coneshaped element for a plug valve.

18. The flow control element of claim 12, wherein said ceramic insert is substantially cylindrically shaped.

19. The flow control element of claim 12, wherein said ceramic insert is comprised of a material selected from a group consisting of partially stabilized zirconia, silicon carbide, alumina, and nitride.

* * * * *